J. W. COSTELLO.
SAW.
APPLICATION FILED JULY 14, 1909.
963,520.
Patented July 5, 1910.
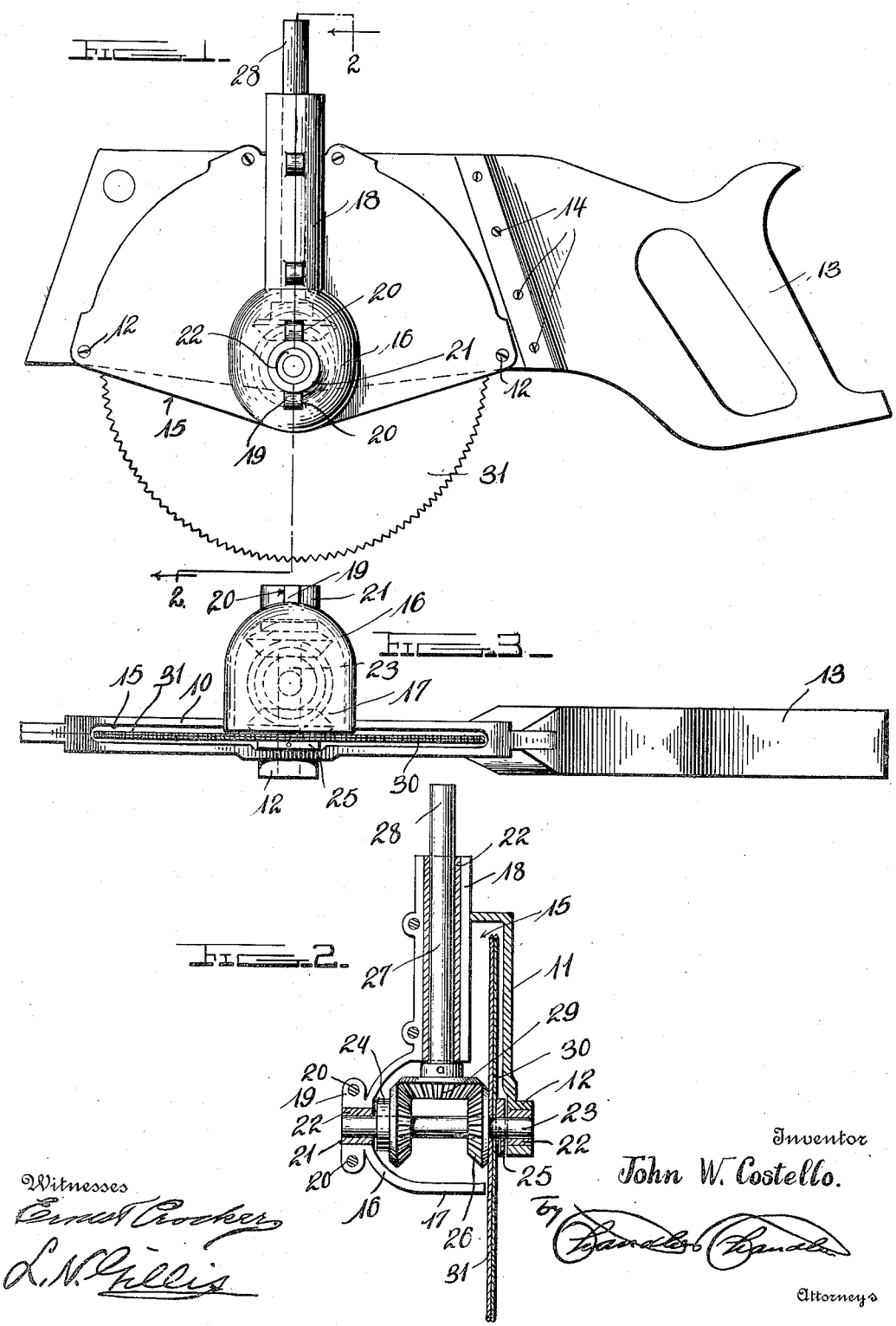
Witnesses
Ernest Crocker
L. N. Gillis
Inventor
John W. Costello.
by
Chandler & Chandler
Attorneys

UNITED STATES PATENT OFFICE.

JOHN W. COSTELLO, OF CHAMPLAIN, NEW YORK.

SAW.

963,520.   Specification of Letters Patent.   Patented July 5, 1910.

Application filed July 14, 1909. Serial No. 507,641.

*To all whom it may concern:*

Be it known that I, JOHN W. COSTELLO, residing at Champlain, in the county of Clinton and State of New York, subject of Canada, have invented a new and useful Saw, of which the following is a specification.

This invention relates to saws such as are used by butchers in cutting through bone.
One object of the invention is to provide a novel form of double bladed circular saw in which the blades shall be driven in opposite directions.

The invention consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a side elevation of a saw constructed in accordance with this invention. Fig. 2 is a section on the line 2—2 of Fig. 1. Fig. 3 is a bottom plan view of Fig. 1.

The frame or casing of the saw comprises what may be termed a main member 10 and a cover member 11. These members are connected by means of bolts or screws 12 and at one end there is attached to the two members a handle 13 of the ordinary form, the same being secured to the frame or casing by means of screws 14. The central parts of the members 10 and 11 are spaced apart to form a saw receiving recess 15 and upon the lower edge of the member 11 is formed a bearing boss 12.

Extending outwardly from the lower part of the member 10 is a convex portion 16, the lower edge of which extends inward as at 17 to form a gear guard as will be hereinafter apparent. From the upper portion of the member 10 extends a sleeve 18.

It is to be noted that the member 10 is made in two halves for convenience in assembling the parts and that the line of separation of these halves is through the center of the sleeve 18.

On each half of the member 10 there are provided certain bosses 19 having screw receiving openings therethrough and the two halves of the member 10 are held together by means of screws 20 passing through these openings. The boss 12 has a companion boss 21 formed in the member 10 in axial alinement with said boss 12. Each of the bosses 12 and 21 and the sleeve 18 are provided with suitable solid bushings 22.

Supported in the bearing bosses 12 and 21 is a shaft 23 and secured upon this shaft adjacent the boss 21 is a bevel gear 24. This shaft further is provided with a collar 25 adjacent the boss 12 and running loosely on the shaft adjacent this collar is a bevel gear 26.

Extending through the sleeve 18 is a drive shaft 27 provided with a polygonal end 28 arranged to be engaged by the clutch on the end of a flexible shaft driven from any suitable source of power, neither the shaft nor the driving mechanism being deemed necessary here to be shown as the same forms no part of this invention.

Upon the lower end of the shaft 27 is a bevel gear 29 which meshes with the gears 24 and 26 so that as the shaft 27 is revolved in one direction one of the gears with which the gear 29 meshes will be driven in one direction and the other in the opposite direction.

Upon the collar 25 is secured a saw blade 30 while to the gear 26 is secured a similar saw blade 31, the blades being of the same diameter but having the teeth in one facing in the opposite direction to the teeth in the other.

In the operation of this invention the handle 13 is grasped and the flexible shaft started in any of the ordinary manners. This causes the gears 26 and 24 to rotate in opposite directions as hereinabove described, with the result that the saws 30 and 31 likewise revolve in opposite directions. It will be apparent that when the saws strike bone or the like material the action of one saw in tending to move the device in one direction will be compensated for by the action of the other saw tending to move the device in the opposite direction. There will thus be no tendency to jump, and in consequence the cutting will be more rapid and splintering eliminated.

While a specific form of casing is herein shown and described it is to be noted that the same forms no part of the invention claimed in this application.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, a frame, a shaft mounted in said frame, a gear loosely mounted upon said shaft, a circular saw blade mounted on said shaft, a second circular saw blade mounted on said gear, and means to revolve the gear in one direction and the shaft in the opposite direction whereby said saw blades are oppositely revolved.

2. In a device of the kind described, a frame, a shaft mounted in said frame, a gear loosely mounted upon said shaft, a circular saw blade mounted on said shaft, a second circular saw blade mounted on said gear, and means to revolve the gear in one direction and the shaft in the opposite direction whereby said saw blades are oppositely revolved, said means comprising a second gear fixed on said shaft and in spaced relation to the first mentioned gear, both of said gears being inwardly facing bevels, a third gear meshing with the first mentioned gears, and a shaft carried in said frame secured to the third gear and provided with means for connection to the driving mechanism.

JOHN W. COSTELLO.

Witnesses:
A. COSTELLO,
SUSAN E. MEEHAN.